UNITED STATES PATENT OFFICE.

WILLIAM KIEL, OF BUTLER, NEW JERSEY, ASSIGNOR TO KIEL, BUTLER & TURNBULL, OF NEW YORK, N. Y.

PROCESS OF MANUFACTURING VULCANIZED PLASTIC COMPOUNDS.

SPECIFICATION forming part of Letters Patent No. 430,959, dated June 24, 1890.

Application filed September 30, 1889. Serial No. 325,594. (No specimens.)

*To all whom it may concern:*

Be it known that I, WILLIAM KIEL, a citizen of the United States, residing at Butler, in the county of Morris and State of New Jersey, have invented a certain Improvement in the Process of Manufacturing Vulcanized Plastic Compounds.

The following is a full, clear, and exact description of my invention.

My invention relates to a process of manufacturing hard vulcanized plastic rubber compounds in which there is as an essential ingredient a quantity of sulphur much greater than can be used by any other process in the manufacture of hard rubber and its compounds.

My invention relates particularly to the process of manufacturing the compounds described in the application by me for Letters Patent filed simultaneously herewith, Serial No. 325,593, filed September 30, 1889, in which sulphur enters as an ingredient in the proportions of not less than approximately eighty per cent. of the weight of the rubber.

The process of vulcanization of hard rubber and its compounds as now practiced is ordinarily carried on by the means of steam-heat. The steam-pressure in the vulcanizer is at the beginning of the vulcanization about fifteen pounds to the square inch, corresponding to about 250° of Fahrenheit, and this steam-pressure is gradually increased until at the end of the process of vulcanization it is equal to about sixty pounds, corresponding to about 308° of Fahrenheit. The greatest quantity of sulphur which can practically be used under this process of vulcanization is about sixty per cent. in weight of the rubber used. Many attempts have been made to increase the quantity of sulphur; but the proportion has practically been limited to sixty per cent. in weight, while by my process from eighty per cent. to one hundred and fifty per cent. can be advantageously used.

My new process of vulcanization consists in commencing with a pressure (or temperature) not less than that at which the present process of vulcanizing hard rubber ends—namely, not less than about sixty pounds steam-pressure to the square inch, (corresponding to about 308° of Fahrenheit,) and retaining that pressure constant during the entire process of vulcanization if the vulcanization continues less than three hours, or reducing it gradually after the third hour if it continues longer than three hours.

In this application whenever I refer to the "pressure" I mean the pressure of steam in the vulcanizer and the corresponding temperature. Vulcanization by steam-heat is the most advantageous method.

In the application for Letters Patent above referred to I have stated that my new compound can be made either hard and rigid or hard and flexible. The same process is applicable to produce my new compound in either shape, there being merely a change in the duration of the vulcanization or in the amount of pressure in the vulcanizer, as I shall show hereinafter.

I will first describe my process as applied to the manufacture of that compound in a hard and rigid condition. If the sulphur and rubber are taken in approximately equal weights, (or if the sulphur is in a smaller proportion,) I can vulcanize the ingredients of my new compound for seven hours with an initial pressure of sixty pounds to the square inch. This pressure is kept constant for three hours, and then gradually reduced. I have found that about seven hours is the longest time necessary for complete vulcanization according to my process. I can equally advantageously vulcanize the ingredients of my new compound in the above proportions for one hour with an initial pressure of one hundred pounds. This pressure remains practically constant during the process of vulcanization. It will be seen that I reduce the time of vulcanization at the rate of one and one-half hour for each ten pounds of increased pressure above sixty pounds. I have not found it advantageous to go above one hundred pounds pressure when not using more than approximately equal weights of sulphur and rubber. When the sulphur is greater in weight than the rubber, (up to about one hundred and fifty per cent.,) I can vulcanize the ingredients of my new compound for a period of one hour at one hundred and ten pounds. I have not found it practicable to go below this pressure with the ingredients in these proportions. I can increase the pressure and shorten the time until at one hundred and twenty-five pounds pressure the vulcanization lasts but one-half hour.

To apply my process to the production of my new compound as a hard, but flexible, substance, I proceed as follows: I shorten the time which I have stated is necessary for the production of my new compound as a hard and rigid substance and retain the pressure as before, or I reduce the pressure without shortening the time, or I both reduce the pressure and shorten the time. A pressure of sixty pounds for a period of three hours, or a pressure of eighty pounds for a period of one hour, will produce my new compound in its hard and flexible form when the same proportions of ingredients are used as before; but I do not reduce the pressure at any time below about sixty pounds.

In the above-mentioned application for Letters Patent for my new compound I have described my new compound as consisting of rubber and sulphur, the sulphur being in weight not less than approximately eighty per cent. of that of the rubber used. I have also stated that I have found it very advantageous to mix with the sulphur and rubber mineral oil, such as petroleum, or to a certain extent, but with less satisfactory results, vegetable or animal oils.

The ingredients of my new compound are mixed together upon the heated rollers now used in the manufacture of hard rubber. When no mineral oil is used, the crude rubber is preferably ground upon the rollers (which should be kept hot) until it becomes a soft mass of the consistency of thick dough, and the sulphur is then mixed with it upon the rollers. When mineral oil is used, it is preferable to first mix it with the sulphur in any convenient vessel, and to then mix the mass thus obtained with the crude rubber upon the heated rollers referred to. The proportion of mineral oil used varies with the quantity of the sulphur used in my new compound. It varies in weight from one-fortieth to two-fifths of the weight of the sulphur used. A large proportion of oil increases the flexibility of, but reduces the elasticity of, the finished product.

To produce my new compound in its hard stiff form, I preferably use with the other ingredients mineral oil, in weight, from one-fortieth to one-fifth of that of the sulphur. To produce it in its more flexible form, I preferably use mineral oil in weight from one-fifth to two-fifths of that of the sulphur.

By my invention I reverse the method applied in the usual known processes of vulcanizing hard-rubber compounds by beginning at a pressure which is not less than that at which at present vulcanization of hard-rubber compounds is terminated, and by retaining it constant for not over three hours and then gradually reducing it. This process, if applied to the manufacture of hard rubber as now made, produces a porous imperfect article. In like manner, if the well-known process of manufacturing hard rubber as now made is applied to my new compound, an insufficiently-vulcanized porous and non-homogeneous mass is produced.

By my invention I reduce the time of vulcanization of hard vulcanized compounds as now practiced from one-half to one-twelfth of the time now required—a matter of great importance, as it considerably increases the production of the vulcanizers.

The hard compound which is the result of my process can be made as hard and rigid as the hardest hard rubber, or hard and flexible to a degree unknown in hard vulcanized rubber compounds as heretofore made.

In its hard and rigid form my new compound is of a rich, deep, jet-black color throughout, superior to that of hard vulcanized compounds as now usually made, and it is equally superior to such hard vulcanized compounds, in that it can be more easily and more highly polished than any of such compounds now known. It is at ordinary temperatures far more flexible than the hard vulcanized compounds heretofore made, and when warmed becomes considerably more pliable than such compounds when subjected to the same heat. It is less brittle than such compounds, and particularly so when mineral oil is used, and it is always cheaper. It has a different fracture in its being more glassy than that of other hard vulcanized compounds now known. It can be turned upon a lathe with greater facility and with less injury to the tools used than any of such compounds. It gives a clean, long shaving, and this shows that it possesses qualities which are of the greatest value when nicety and fineness of workmanship upon the lathe is required.

When in the shape of a hard flexible substance, my new compound is so flexible that a rod or tube of it can be bent or twisted into any shape without injury to the material. This would be impossible with a like article of any other known hard vulcanized compound. At the same time it can also be polished, though to a somewhat less degree than my new compound in its hard and rigid shape. It is impervious to moisture and can be used to great advantage as an insulating substance for electric wires.

I am aware of the Letters Patent issued to Franz Wilhoft, No. 321,410, dated June 30, 1885, for an invention which has for its object to produce vulcanized soft rubber in which all the sulphur (not over three and three-fourths per cent.) is chemically combined with the rubber, and which consists, essentially, in exposing the rubber with sulphur to a minimum heat of 330°; but this is not my invention, and I do not claim it as such, and I am aware that petroleum and some of its products have been used as solvents of rubber, and that petroleum has been used as described in Letters Patent No. 233,600, dated October 26, 1880, to John H. Cheever, in a process of reclaiming rubber from old and waste vulcanized rubber, and utilizing the same in the manufacture of soft rubber goods; but that again is quite distinct from my invention, and is not claimed by me.

What I do claim, and desire to secure by Letters Patent, is—

1. The herein-described process of manufacturing vulcanized plastic rubber compounds, consisting in mixing together sulphur and rubber, the sulphur being in the proportion of not less than about eighty per cent. of the rubber, by weight, and vulcanizing the compound with an initial temperature of not less than about 300° Fahrenheit and for the periods of time set forth, substantially as described.

2. The herein-described process of manufacturing vulcanized plastic rubber compounds, consisting in mixing together sulphur, rubber, and oil, the sulphur being in the proportion of not less than about eighty per cent. of the rubber, by weight, and vulcanizing the compound with an initial temperature of not less than about 300° Fahrenheit and for the periods of time set forth, substantially as described.

WILLIAM KIEL.

Witnesses:
JOSEPH F. McLEAN,
GEO. F. McLEAN.